US 7,571,082 B2

(12) United States Patent
Gilpin et al.

(10) Patent No.: US 7,571,082 B2
(45) Date of Patent: Aug. 4, 2009

(54) COMMON COMPONENT MODELING

(75) Inventors: Brian M. Gilpin, Novato, CA (US);
Paul J. Griffo, Portland, OR (US)

(73) Assignee: Wells Fargo Bank, N.A., San Francisco, CA (US)

( * ) Notice: Subject to any disclaimer, the term of this patent is extended or adjusted under 35 U.S.C. 154(b) by 264 days.

(21) Appl. No.: 11/156,129

(22) Filed: Jun. 17, 2005

(65) Prior Publication Data
US 2006/0031048 A1 Feb. 9, 2006

Related U.S. Application Data

(60) Provisional application No. 60/582,100, filed on Jun. 22, 2004.

(51) Int. Cl.
*G06F 9/455* (2006.01)
(52) U.S. Cl. .................. 703/6; 703/2; 703/14; 703/22; 705/10; 717/120; 717/135
(58) Field of Classification Search .................... 703/2, 703/6, 9, 14, 22; 707/1; 709/223, 205; 705/1, 705/7, 26; 717/135, 120; 719/321
See application file for complete search history.

(56) References Cited

U.S. PATENT DOCUMENTS

| | | | |
|---|---|---|---|
| 5,222,235 A | 6/1993 | Hintz et al. | |
| 5,768,586 A | 6/1998 | Zweben et al. | |
| 6,202,044 B1 | 3/2001 | Tzori | |
| 6,216,098 B1 * | 4/2001 | Clancey et al. | 703/6 |
| 6,278,963 B1 | 8/2001 | Cohen | |
| 6,427,132 B1 | 7/2002 | Bowman-Amuah | |
| 6,473,794 B1 | 10/2002 | Guheen et al. | |
| 6,513,065 B1 | 1/2003 | Hafez et al. | |
| 6,539,396 B1 | 3/2003 | Bowman-Amuah | |
| 6,560,647 B1 | 5/2003 | Hafez et al. | |
| 6,564,174 B1 | 5/2003 | Ding et al. | |
| 6,601,192 B1 | 7/2003 | Bowman-Amuah | |

(Continued)

OTHER PUBLICATIONS

Wangerin, D. DeCoro, C. Campos, L.M. coyote, H. Scherson, I.D.; "A Modular Client-Server Discrete Event Simulator for Network Computers"; Simulation Symposium, 2002. Proceedings, 35th Annual, pp. 125-133.*

(Continued)

*Primary Examiner*—Paul L. Rodriguez
*Assistant Examiner*—Kandasamy Thangavelu
(74) *Attorney, Agent, or Firm*—Merchant & Gould P.C.

(57) ABSTRACT

A method and apparatus for producing predictive performance and capacity information employing a type of factory to reduce the ongoing cost of providing simulation models to answer questions raised by the various business entities is provided. To achieve this, a continual process for providing on-going performance information is provided. The core concept is the development and long-term reuse of component models to create other, more broadly scoped performance models. This requires the implementation of standard simulation model constructs to facilitate reuse, processes for the development of models and their use by clients, and a stable yet flexible repository for component models. The invention comprises processes, standards, templates, and software tools that implement a performance service that consists of the long term maintenance of predictive performance models for repeated use by lines of business to provide capacity planning information.

15 Claims, 14 Drawing Sheets

U.S. PATENT DOCUMENTS

| | | | |
|---|---|---|---|
| 6,601,233 B1 | 7/2003 | Underwood | |
| 6,601,234 B1 | 7/2003 | Bowman-Amuah | |
| 6,615,199 B1 | 9/2003 | Bowman-Amuah | |
| 6,636,242 B2 | 10/2003 | Bowman-Amuah | |
| 6,640,238 B1 | 10/2003 | Bowman-Amuah | |
| 6,640,249 B1 | 10/2003 | Bowman-Amuah | |
| 6,643,614 B2 | 11/2003 | Ding et al. | |
| 7,194,426 B1* | 3/2007 | Box | 705/26 |
| 7,389,211 B2* | 6/2008 | Abu El Ata et al. | 703/2 |
| 2001/0049595 A1 | 12/2001 | Plumer et al. | |
| 2001/0052108 A1 | 12/2001 | Bowman-Amuah | |
| 2002/0083420 A1* | 6/2002 | Zammit et al. | 717/135 |
| 2002/0183996 A1* | 12/2002 | Lee et al. | 703/9 |
| 2003/0009386 A1 | 1/2003 | Menninger | |
| 2003/0023686 A1* | 1/2003 | Beams et al. | 709/205 |
| 2003/0046130 A1* | 3/2003 | Golightly et al. | 705/7 |
| 2003/0046294 A1 | 3/2003 | Heronimus | |
| 2003/0058277 A1 | 3/2003 | Bowman-Amuah | |
| 2003/0061081 A1 | 3/2003 | Kellond et al. | |
| 2003/0069778 A1 | 4/2003 | Menninger et al. | |
| 2003/0074247 A1 | 4/2003 | Dick et al. | |
| 2003/0093256 A1* | 5/2003 | Cavanagh et al. | 703/14 |
| 2003/0115037 A1* | 6/2003 | Sumida | 703/22 |
| 2003/0120502 A1 | 6/2003 | Robb et al. | |
| 2003/0149556 A1* | 8/2003 | Riess | 703/21 |
| 2003/0177018 A1* | 9/2003 | Hughes | 705/1 |
| 2003/0187967 A1* | 10/2003 | Walsh et al. | 709/223 |
| 2004/0102940 A1* | 5/2004 | Lendermann et al. | 703/6 |
| 2004/0138867 A1* | 7/2004 | Simkins | 703/22 |
| 2004/0162805 A1* | 8/2004 | Wozniak | 707/1 |
| 2004/0181378 A1* | 9/2004 | Gilmore | 703/6 |
| 2004/0220792 A1* | 11/2004 | Gallanis et al. | 703/13 |
| 2005/0043977 A1* | 2/2005 | Ahern et al. | 705/7 |
| 2005/0096950 A1* | 5/2005 | Caplan et al. | 705/7 |
| 2005/0102124 A1* | 5/2005 | Root et al. | 703/14 |
| 2005/0246722 A1* | 11/2005 | Shier et al. | 719/321 |

OTHER PUBLICATIONS

BMC Software; Mainview® for Performance Assurance®; Mainview® Predict Performance Console User Guide; Version 1.3; Sep. 27, 2002.

BMC Software; Mainview® Predict; © 2002 BMC Software, Inc; Dec. 2002.

Braine, L. (Andersen Consulting), Clark, C. (Dept. Computer Science, University College London); Simulating an Object-Oriented Financial System in a Functional Language; Publication date: Unknown; Novelty Search date: Nov. 25, 2003.

OPNET; IT Guru: Intelligent Network Management for Enterprises; Web page; OPNET Technologies, Inc.,2003.

Filipe, J.K.; A logic-based formalization for component specification; Lab for Foundations of Computer Science, Univ. of Edinburgh, United Kingdom; jkf@dcs.ed.ac.uk; 2002.

Beznosov, K.; Information Enterprise Architectures: Problems and Perspectives; Technical Report; Jun. 14, 2000; Florida Intn'l Univ., Sch.

BMC Software; Enterprise Performance Assurance Web Page; www.bmc.com; 2003.

HyPerformix Integrated Performance Suite™, Making eBusiness Perform; Web Page www.hyperformix.com; Austin, Texas, USA; 2003.

OPNET Technologies, Inc.; Web Page; www.opnet.com ; Bethesda, Maryland, USA; 2003.

Lewis D.E.; A Framework for the Development of Service Management Systems for the Open Service Market; Thesis; Dept. of Computer Science; Univ. College London, UK; Mar. 1, 2000.

HyPerformix Integrated Performance Suite™, Software that Engineers Performance; Web Page; webmaster@hyperformix.com; 2003.

JIfeng, H., et al; Contract-Oriented Component Software Development; Intnl Institute of Software Technology, The United Nations University; (UNU/IIST Report No. 276), Mar. 2003.

* cited by examiner

COMMON COMPONENT MODELING

CROSS-REFERENCE TO RELATED APPLICATIONS

This application claims priority to U.S. Provisional Patent Application Ser. No. 60/582,100, filed on Jun. 22, 2004, which application is incorporated herein in its entirety by the reference thereto.

BACKGROUND OF THE INVENTION

1. Technical Field

The invention relates generally to computerized discrete event simulation techniques. More particularly, the invention relates to a method of providing capacity planning information for IT systems by modeling them as discrete event simulations on a continual basis.

2. Description of the Prior Art

Predicting capacity requirements for Information Technology (IT) systems using simulation models is critical to the efficient and flexible deployment of computer and network assets to meet rapidly changing business environments. Complex system models that are devised using discrete event simulation software, such as simulation models, provide a projection of future requirements by representing the relationships between collections of parameters that describe traditional computer or communications systems measures, such as CPU speeds, queue lengths, and network link bandwidths, as well as many others, with more abstract, business-centered values, such as projected increases in business transaction volumes, changes in workload distribution, or increased worker efficiencies through enhanced skills training.

The current processes and functions to define, develop and utilize simulation modeling for capacity planning are time-consuming, very complex and, typically, pursued uniquely for each business situation or problem. Developing, executing, and interpreting the results produced by simulation models requires extensive involvement of highly skilled technical resources. In order to satisfy an increasing demand for capacity planning simulation models, a more cost effective and streamlined approach is necessary. Specifically the following challenges must be addressed:

Reduce the time to create an effective model that addresses specific system performance or capacity questions. Typically, it takes from eight to twelve weeks to develop a single discrete event simulation model that is designed to answer a concise set of questions concerning the future performance of a specific system under study. Although this time period has been traditionally considered acceptable for supporting long range system planning efforts, it limits the usefulness of a simulation model for making short-term operational adjustments, or for quickly evaluating the impact of sudden unexpected changes in the business environment on the computing infrastructure.

Lower the cost per model, which is the primary driver of the costs incurred in the process of answering concise performance or capacity questions. Developing a discrete event simulation that models a production IT environment is a resource intensive activity requiring experienced performance engineers to gather and evaluate data regarding the system targeted for study, measure and characterize the workloads imposed on the system, devise a model of the system in a computer-executable format, validate the effectiveness of the model, design and conduct a series of experiments using the model, and compile and interpret the results produced by the model. The nature of techniques required to create a discrete event simulation makes it difficult to change the resource intense nature of developing a new model.

It would be advantageous to institute a type of modeling factory that employs processes and techniques that would substantially reduce the overall time required to answer specific performance and capacity questions that are posed by business clients. This would include establishing the means to retain, recombine, and extensively reuse various simulation models that have been previously developed. Such models could be quickly applied with relatively few changes in updated experimental scenarios.

It would further be advantageous to provide a type of modeling factory using tools and techniques that reduce the cost of devising a simulation model to respond to specific performance and capacity questions, by reducing the amount and cost of resources consumed in developing and applying comprehensive models of commonly used business functions, systems, or services.

SUMMARY OF THE INVENTION

A method and apparatus for generating predictive capacity and performance information to be used in Information Technology (IT) planning processes, by employing a modeling process that reduces the ongoing costs of developing, maintaining, and applying discrete event simulation techniques is provided. To achieve this, what is currently a custom process for developing individual discrete performance models is transformed into a continuous process for providing on-going performance information. The core concept is to develop simulation models by creating other simulation models as components which can then be retained and reused in combination with one another to answer future performance questions. This process requires devising standard component model constructs that facilitate their reuse and recombination, tools to combine component models into composite models, processes for the development of new composite models from components, and a stable, flexible repository for retaining and retrieving models so constructed. The invention comprises processes, software-based standards and templates, and computer software tools that collectively implement a predictive performance and capacity information service.

DETAILED DESCRIPTION OF THE INVENTION

Figure 1A:
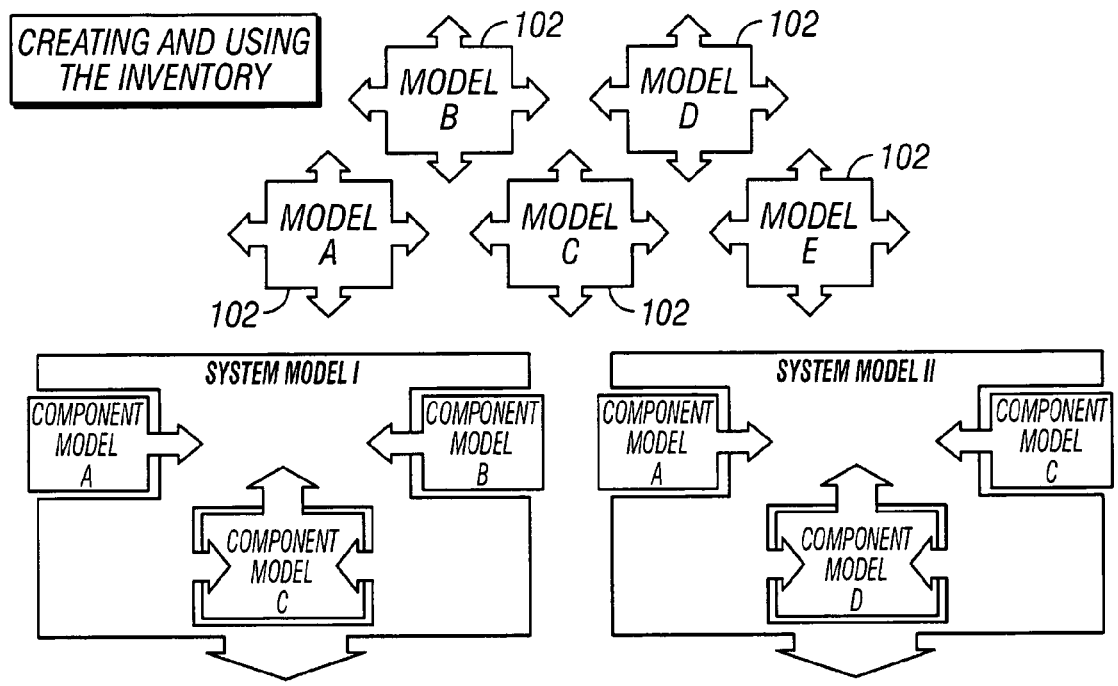
FIG. 1A is a schematic diagram of individual Common Component Models (CCMs) according to the invention.

A method and apparatus for generating predictive capacity and performance information to be used in Information Technology (IT) planning processes, by employing a modeling process that reduces the ongoing costs of developing, maintaining, and applying discrete event simulation techniques is provided. To achieve this, what is currently a custom process for developing individual discrete performance models is transformed into a continuous process for providing on-going performance information. The core concept is to develop simulation models by creating other simulation models as components which can then be retained and reused in combination with one another to answer future performance questions. This process requires devising standard component model constructs that facilitate their reuse and recombination, tools to combine component models into composite models, processes for the development of new composite models from components, and a stable, flexible repository for retaining and retrieving models so constructed. The invention comprises processes, software-based standards and templates, and computer software tools that collectively implement a predictive performance and capacity information service.

A type of modeling factory is created by consolidating specific software tools, unique construction techniques, and explicit standards for component and composite model designs under a comprehensive, continual process. This factory may result in substantial reductions in the costs of developing, maintaining, and applying discrete event simulation techniques to generating performance and capacity information for a business function. The core concept enabling this factory process is to devise individual, narrowly scoped simulation models as reusable software entities that may be subsequently combined into a different, more broadly scoped simulation model. Designated as component models, these entities can be individually retained, manipulated, and retrieved. By combining them into the context of more broadly scoped simulation models, distinguished as "composite models", one is able to generate information addressing specific performance and capacity questions that is beyond the capability of any of the component models individually.

Component models are computer software entities comprised of data and processing instructions, which conform to a distinctive common structure and standard. This standard, coupled with specific tools for manipulating component models, facilitate their recombination into composite models. New composite models are constructed from a collection of pre-formulated component models that are retained in a stable, flexible repository. The invention comprises the component and composite model development processes, common component model standards, composite model templates, and computer software tools that implement this performance and capacity information service capability.

Overview of Common Component Modeling

Definition of a Common Component Model

One embodiment of the invention creates and employs Component Models (CM), which are also referred to herein as Common Component Models (CCM). A Common Component Model is a software-based discrete event simulation that is designed to dynamically represent, or model, the performance characteristics and capacity constraints of a narrowly specified information technology function, system, or service. That function, system or service is used in a variety of business applications, a so-called "core enterprise" function. A combination of such software entities, or composite model may be "run", or executed with experimental settings, in which various workloads and operating conditions are emulated and applied. A more detailed description is provided hereinbelow.

An Exemplary Modeling Process and Methodology

Using Standardization and Modularization

In one embodiment of the invention, the production of information regarding the capacity limits and performance characteristics of a system under study is provided through a software-based technique known as discrete event simulation. Discrete event simulation techniques, implemented in specialized software tools, are used to devise functional models that can be executed, or "run", on a computer platform. Discrete event simulation tools have been developed over the course of nearly three decades.

There are five essential steps to the invention's modeling process:

Establish the scope of the function, system or service to be analyzed (sometimes referred to as the "system under study" or "target system") and identify particular aspects of the target systems' performance or capacity that are of interest;

Identify the data types that are relevant to the performance or capacity characteristics of interest, and follow by gathering, analyzing, and interpreting such data that is derived from the target system itself, as either measurements or configuration specifications;

Devise a model, or dynamic representation of the target system within the constraints of its defined scope, which embodies the relationships between parameters that contribute significantly to the system's behavior, and minimizes or eliminates inconsequential relationships (abstraction), and validate the effectiveness of the model's predictive accuracy;

Develop projections of performance and capacity characteristics by driving the model of the system under study with hypothetical data; and Interpret the significance of the model's projections in the context of the system under study.

The conduct of the invention's modeling process is most efficient when the constituent procedures are organized as repetitive, routine operations, using standardized elements, modularized functions, and common structures.

Defining Core Enterprise Functions

As shown in FIG. 1A, each Common Component Model (CCM) 102 of the invention is devised as a discrete event simulation model, capable of contributing distinct results that predict performance characteristics of narrowly specified "core enterprise function". A core enterprise function is a technology-based function, system or service which can be combined in various ways to deliver part of the function of assorted, higher-level so-called "business functions". Business functions are employed in various settings throughout an enterprise's businesses, and may be implemented by using both technology-based, and non technology-based capabilities. In contrast to the core enterprise function, business functions are designed to fulfill a specific end-user need, and may be positioned as marketable services.

Figure 1B:
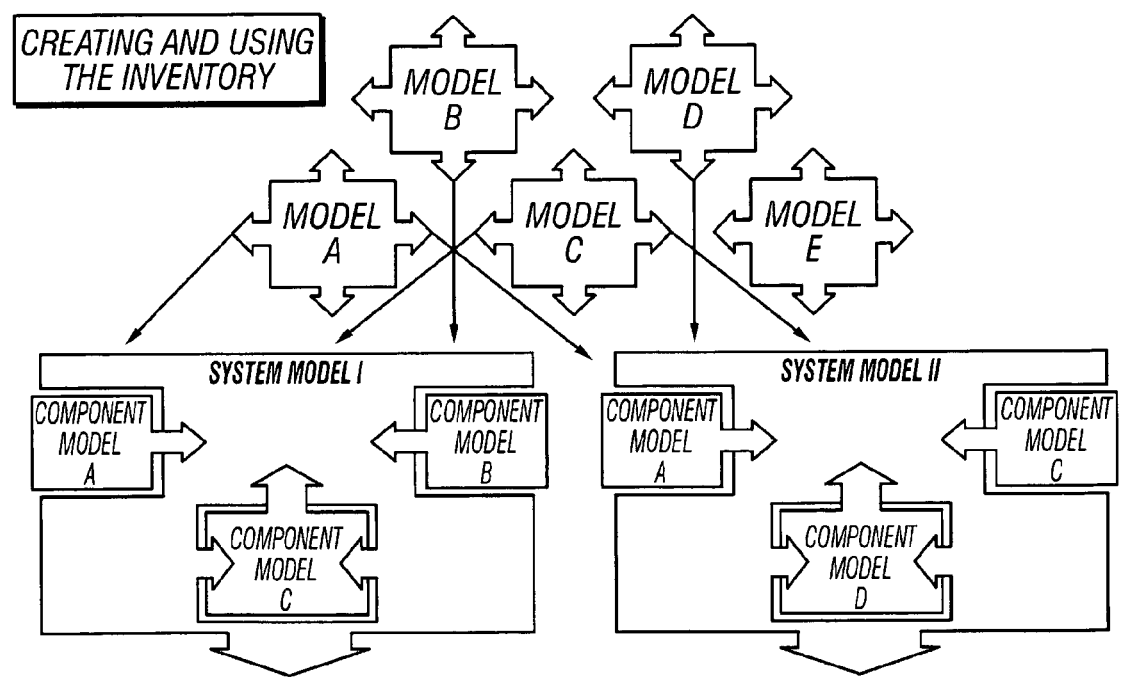
FIG. 1B is a schematic diagram depicting individual the Common Component Models of FIG. 1A used in end-to-end applications according to the invention.

Once validated as an effective model of a core enterprise function, each CCM is subsequently eligible for use in a composite model, in a manner depicted in FIG. 1B. One embodiment of the invention develops and uses an assortment of CCMs combined into more broadly scoped, composite model of select business functions employed in the enterprise. This technique leverages the combined representations of constituent core enterprise functions rendered in the CCMs and contributes to a fuller understanding of the performance characteristics in a more complex, higher-level business function.

Developing an Inventory of Reusable Common Component Models

The efficiency of the modeling process of the invention is further enhanced by developing an organized collection, or "inventory" of CCMs, in computer-accessible storage using automated search and retrieval methods. In one embodiment of the invention, some of the models that are kept in the inventory, representing an assortment of lower-level core enterprise functions, may be automatically invoked during the execution of one or more composite models, each one representing a higher-level business function. These business functions are employed throughout the enterprise, across various products, and even across diverse lines of the enterprise's business.

Benefit of the Component Modeling Approach

It has been demonstrated that, while an investment in the resources, skills, and tools of this discipline can be significant, the return on investment, in terms of cost avoidance or outright operational cost savings, may be orders of magnitude greater than the initial outlay. This is particularly notable in large-scale enterprise information technology operations. The use of discrete simulation models is a substantial element in realizing such benefits. Its impact can be further enhanced when the common component modeling method of the invention is used in ongoing support of a strategic approach to infrastructure capacity management. This effect is evidenced as follows:

The process of developing common component models reveals functions that are delivered over multiple computer and communications technologies and/or platforms and are shared throughout the enterprise.

The systematic creation and ongoing maintenance of a library of CCMs broadens and refines an enterprise's knowledge base of system interactions and interdependencies.

CCMs can serve as an integration point for coordinated capacity planning procedures. By routinely consolidating performance metrics data and using such consolidated data as the basis for driving a predictive performance model, the enterprise has a stimulus for considering and adopting standards of practice across all aspects of the operation.

In addition, secondary benefits accrue to both an enterprise's internal operations and its external customers:

A cost-effective modeling process enables widespread adoption of predictive modeling services by an enterprise's Lines-of-Business, lowering capacity risks and improving customer satisfaction;

New predictive modeling capabilities are consistent with and supportive of an enterprise's initiatives;

Capacity risk management and governance capabilities are enhanced and refined;

Decreased infrastructure support costs through optimization of computing resources.

Ongoing, modeling-based services providing enhanced proactive capacity problem detection; and Easier access to key application performance metrics for analysis and reporting.

It should be appreciated that Component Model reuse reduces the development time and costs of composite models, which are oriented toward answering end-user questions. In addition, the creation of the Common Component Model repository is, in itself, an effective information resource during the discovery phase of any broadly scoped system model development.

Developing a Common Component Modeling Methodology

Successfully developing and delivering Common Component Models according to one embodiment of the invention requires adopting and refining a series of sophisticated processes. Such processes ensure that Common Component Models are structured, organized and maintained in a way that lets an entire organization take advantage of the availability of such CCMs. The processes according to one embodiment of the invention include the following distinct activities:

Maintaining a system of reusable simulation models;

Developing and refining tools providing automated data collection and compilation; and Devising tools and techniques that simplify the process of metrics analysis.

System of Reusable Models

Because reusability depends on accessibility, software source files that comprise CCMs are collected and retained, organized, and controlled. For ensuring the actions described above are performed according to critical standards, the invention provides a set of development practices, conventions, and guidelines with standards specified for essential structures, interfaces, object classifications, data elements, etc.

It should be appreciated that the common components have a long-term life.

Support Metrics Data Collection Automation

Effective simulation models depend, in part, on sets of measurement data collected from the target systems under study that they represent. Collected data underlie the structure of the simulation model and are analyzed for evidence of correlations between the various elements of a complex system.

Successfully coordinating, monitoring, collecting, and compiling critical metrics requires collaboration from all the organizations with operations responsibility for specific platforms and/or technologies.

Automating data collection procedures can be a substantial challenge. One embodiment of the invention provides an advocate for establishing periodic collection of specific performance metrics using current monitoring and testing systems through the efforts of established operating groups throughout the an enterprise. It should be appreciated that the scope of the invention does not necessarily extend to conducting daily operations monitoring of IT infrastructure.

One embodiment of the invention addresses the technical challenge of devising stored program methods to continually synchronize and coordinate metrics data derived from disparate sources throughout the information technology infrastructure. These metric data collection tools are capable of automatically retrieving data from almost all of the networked elements in an IT infrastructure. However, it should be appreciated that some such tools can be limited in the ability to compile and analyze such data in real time.

Simplify Metrics Analysis Skills

The invention provides for using off-the-shelf applications tools that have been customized to support efficient metric data analysis techniques. Some typical steps in the Common Component Modeling process of the invention, such as macros for reducing large data sets or scripts for consolidating distributed data files, help simplify routine analysis.

In an effort to develop a common perspective across an enterprise, the invention provides guidelines for interpreting performance metrics profiles across technologies and platforms. Such guidelines involve actively promoting coordinated performance analysis techniques, conventions, and standards across technology platforms and throughout the enterprise.

Illustrating Common Component Modeling

By modeling through simulation, one can understand the behavior of a complex function by abstracting the essential behaviors of component functions and by stripping away confusing details.

An Analogy: the Automobile

Following is an analogy of the Common Component Model according to one embodiment of the invention. Consider that an automobile is analogous to an end-to-end system. The function of the car, i.e. transportation, is provided to the end user, the driver/occupant. This transportation function is the result of an integrated system of functions: namely, fuel conversion, momentum transfer, platform integrity, and more. Such functions are provided by the various components. For example, the engine converts fuel into a source of rotational momentum, the drive train transmits rotational momentum from the engine to the wheels, the chassis provides a self-contained operating platform for the system, and the body provides a protective enclosure for passengers and cargo.

If an automotive designer wanted to characterize a particular car's fuel efficiency asserting, for example, that "this type of car averages 10.2 miles per gallon under normal highway use," the designer could measure, fuel efficiency, for example by running a vehicle prototype on a test track. But if the designer wanted to understand why a particular car's design gets only 10.2 miles per gallon on the highway, then modeling the system allows the designer to concisely postulate and confirm the relationships among fuel consumption by the engine, torque generated at the clutch plate, transmission efficiency to the differential, etc. Thus the designer clearly has much more comprehensive insight.

It would then be advantageous to simulate the contributing behaviors and the way in which they interact. For example, the automotive designer might simulate the car by combining an engine component model ("this type of engine generates x horsepower from burning y fuel in z time") with a transmission component model ("this drive train design transmits angular momentum from source to sink with n% efficiency") and with a wheels component model ("this caliber of wheels will reach m RPM under a driving load of c Newton-seconds"). Such component models, assuming they've been previously built to operate with one another, can be combined to simulate a car.

It should be appreciated that automobile manufacturers offer customers a large assortment of automobiles through various makes and model lines. However, in this wide assortment of automobiles are a comparatively small number of different engine designs. The engines are designed to possess functional characteristics which are appropriate for multiple potential car designs, although the requirements of each the finished car designs may differ from one to another. By rigorously adhering to a set of design standards for engines, auto manufacturers thereby can ensure that, for example, a single engine type can be combined with three different types of transmissions, resulting in three different auto designs having distinctly different performance characteristics. Therefore, while the engine component is common to each car, the system, i.e. the complete automobile, could be expected to have a distinct and characteristic behavior.

In the same fashion, a Common Component Model of a constituent core enterprise function, according to the invention, wherein such CCM has been effectively scoped, appropriately designed, and carefully implemented, is effective in various composite models of complete, higher-level business functions.

An Exemplary Embodiment of the Invention

Every Common Component Model starts out as a discrete simulation model, producing distinct results and predicting performance characteristics of concisely specified core enterprise functions. However, the ultimate purpose of a CCM is to be combined in broader discrete simulation models, referred to as composite models, leveraging combined results to fuller understanding of performance characteristics in more complex business functions. A component model is characterized by the inclusion of several unique data structures. In one embodiment of the invention, when two or more component models are combined into a model of broader scope, these unique data structures are referred to herein as ports, port specifications, and legacy markers. The Common Component Model is distinguished from an end-to-end model by, among other things, its structure and use. In one embodiment of the invention, structure is manifested in port, port specification, legacy marker, and in one embodiment of the invention, workload specification. In one embodiment of the invention, unique use is embodied in component composition, channel insertion, and batch mode construction.

Port

Each component model is a discrete event simulation which models a real information system. The component model includes one or more representations of elements, which are part of the actual, real system. In every component model, a subset of the set of such element representations is identified and designated, and each element representation of the subset is flagged as an individual port in the component model. In one embodiment of the invention, such flagging is accomplished by including a unique marker in the data structure from which the element's identity is established in the component model source encoding.

The purpose of the port is to designate in a precise and unambiguous fashion the interface at which any one component model may interact, or be interconnected with, various other component models as in a composite model, for example.

Port Specification

It should be appreciated that in one embodiment of the invention, in terms of the software entities themselves for example, such interfaces between two component models interact with one another according to specific capabilities and constraints that are associated with the port. Such specific capabilities and constraints are defined within a port specification. The capabilities and constraints refer to the types of data that are allowed to be exchanged between these entities, refer to the manner of the exchange, and refer to the control of the flow of such exchanges.

The port specification is a unique, distinct data structure that is required to be contained and defined within a component model's source encoding. Each instance of a port specification include data that:

uniquely identifies the port within the component model and among all component models;

precisely identifies the category or type of port that is represented;

identifies the types of ports contained in other component models with which data may be exchanged;

concisely identifies categories of data that may be exchanged with this port instance;

specifies limits as to the amount of data that may be exchanged with the port; and specifies limits as to the number of ports that this port may exchange data with in the context of a single composite model.

The presence of the port specification in the component model source code provides for validation by the simulation engine, the means by which the discrete simulation process is executed. Validation encompasses the evaluation and confirmation of the specified use of a particular port in the context of a composite model in terms of conformance to the particular use and limits contained in its port specification.

Although not an integral structure in a component model, the relationship between any two ports that is established in the context of a composite model defines a channel. Every channel is limited to connecting only two ports, the two connected ports referred to as a channel pair. Although any port may participate in one or more channels in a composite model specification, only one channel may exist between any channel pair of ports.

Legacy Marker

The legacy marker is another distinct data structure that is required to be contained in the component model source encoding. The legacy marker is coded data that conveys the origin and the developmental stages, or versions, of a particular component model. The purpose of the legacy marker is to provide a persistent identifier to each and every component model that can be accessed and evaluated by a builder engine, so that a correct composite model context can be recreated by means of an extensively automated process.

An Exemplary Implementation of a Target System Model

Following is a description of an example implementation of the processes of creating and combining component models into a composite model according to one embodiment of the invention.

Designing a Common Component Model

Figure 2:
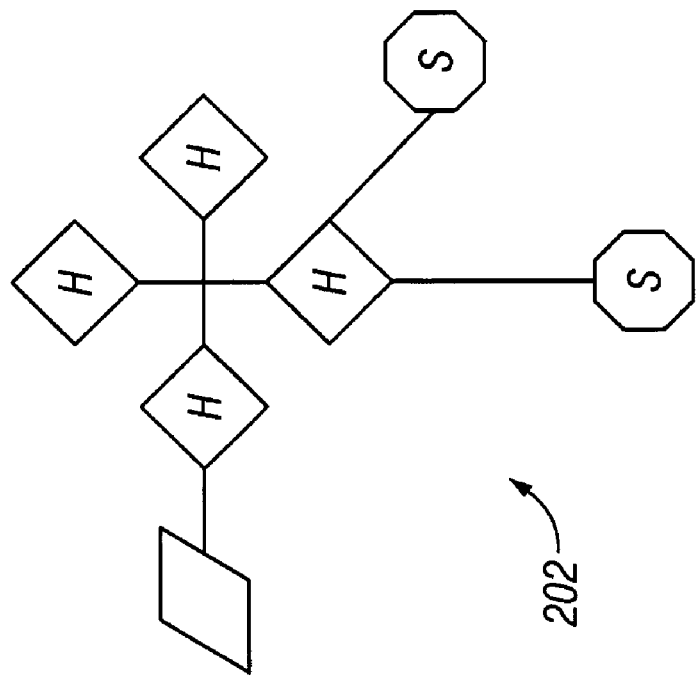
FIG. 2 is a schematic block diagram of a basic IT model according to the prior art.
Figure 2:
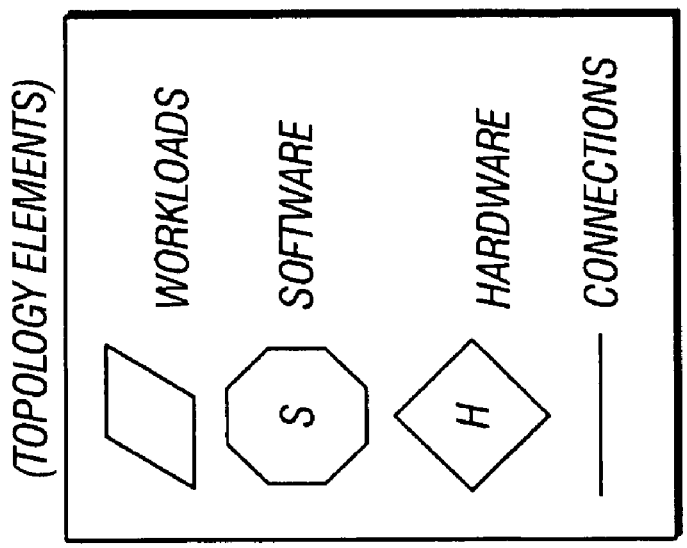

In the example, every IT model of an example enterprise comprises workload elements, topological elements, such as software elements and hardware elements, and connection elements. FIG. 2, a schematic block diagram of a target system according to the prior art, shows how the elements can be combined into a typical IT model 202.

Figure 3:
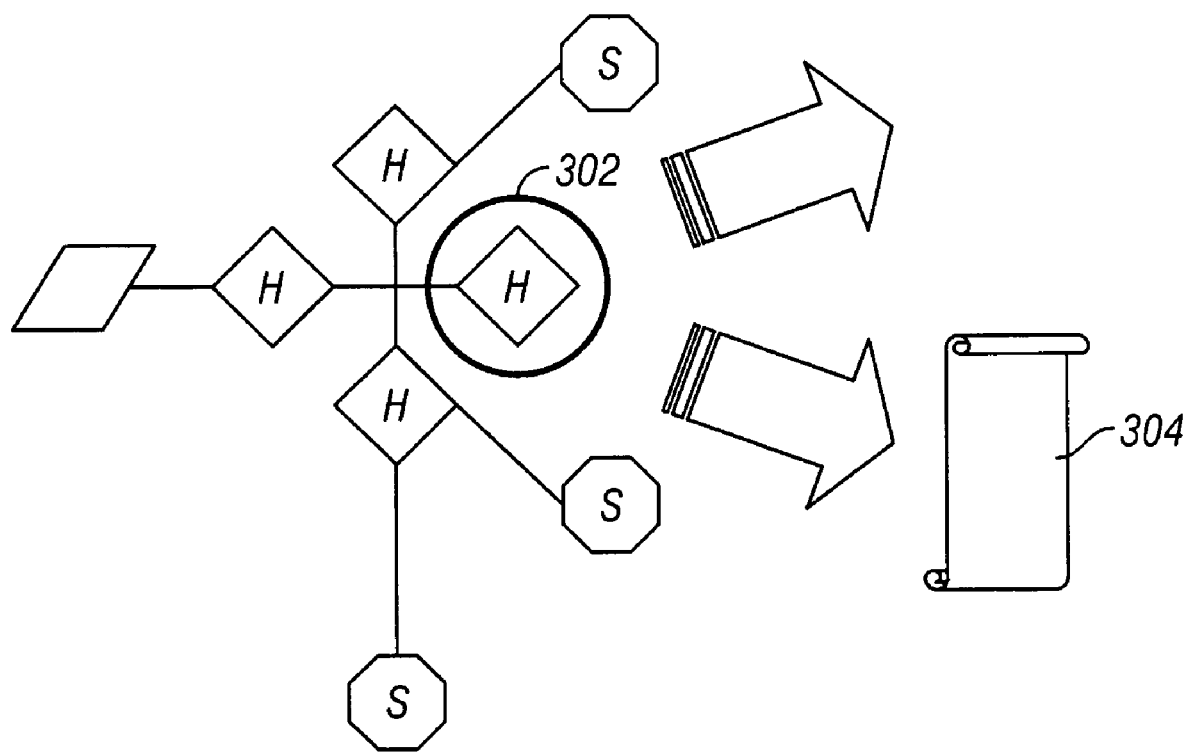
FIG. 3 is a schematic block diagram of a common component model according to the invention.

Referring to FIG. 3, in one embodiment of the invention, a common component model can be viewed as a modified model of a typical IT model of a target system, such as the one shown in FIG. 2. Specifically, when a given IT model is converted to a common component model, at least one topology element is designated as a port 302 and is associated with a port specification 304.

Designing a Composite Model

Figure 4:
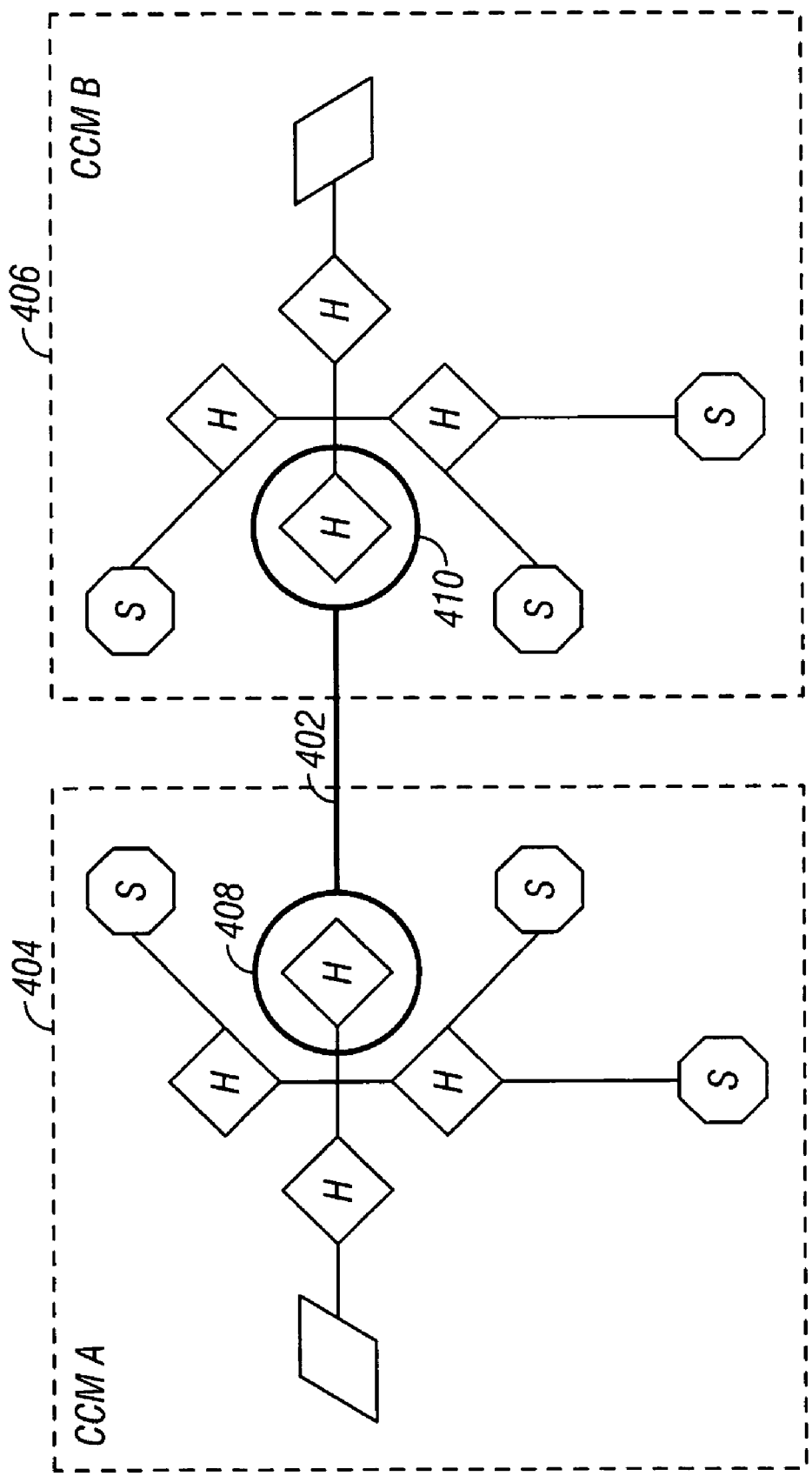
FIG. 4 is a schematic block diagram showing component models linked by a channel according to one embodiment of the invention.

Referring to FIG. 4, created component models, CCM A 404 and CCM B 406, are then linked together through the corresponding topologies by the creation and insertion of a channel 402 between a pair of ports (408, 410).

Figure 5:
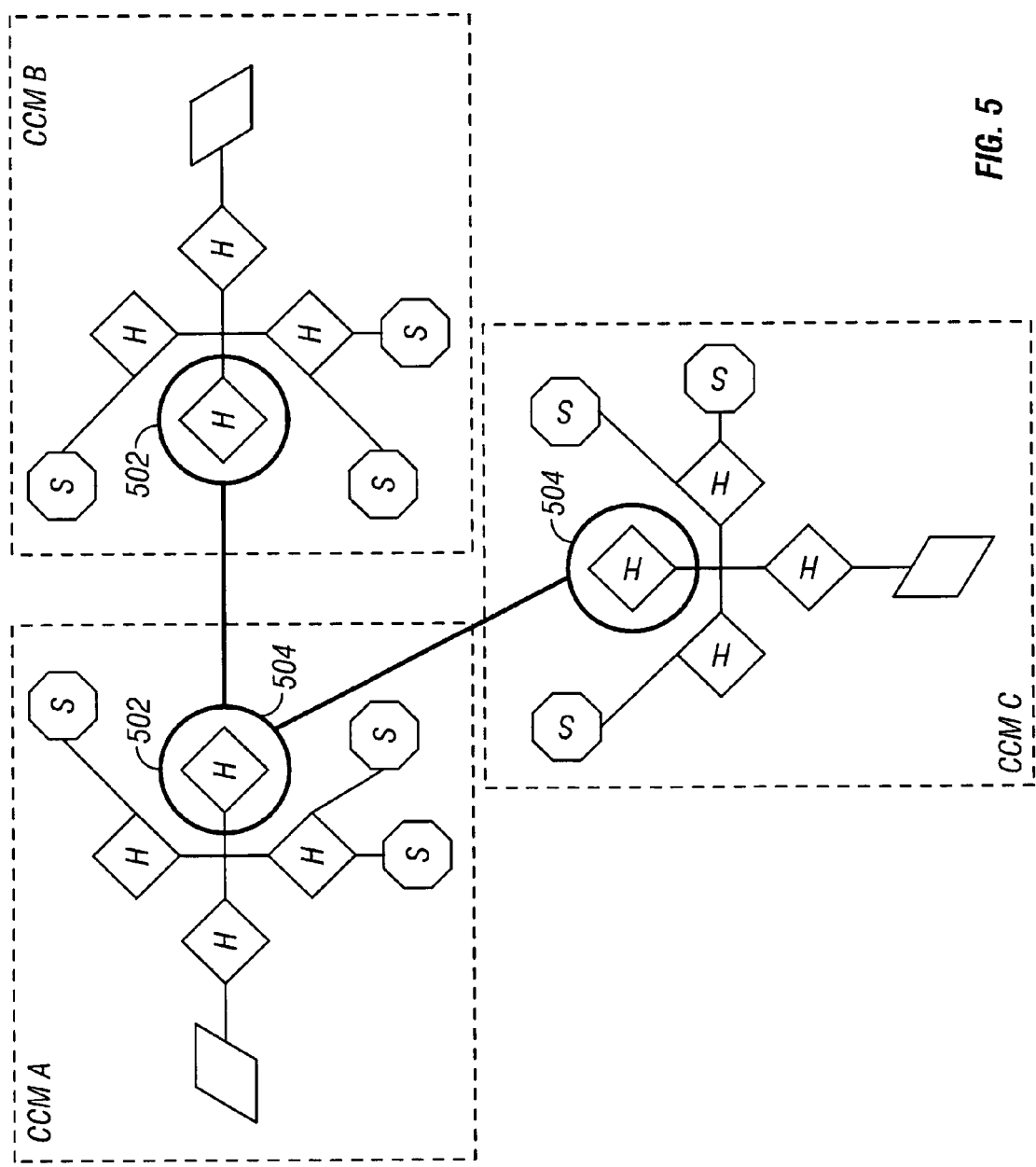
FIG. 5 is a schematic block diagram showing multiple component models linked together via port-pairs according to the invention.

It should be appreciated that the invention provides for multiple component models to be linked together. Such linkage is accomplished via port-pairs, as shown in FIG. 5. FIG. 5 show a first port-pair 502 between component models CCM A and CCM B and a second port-pair 504 between CCM A and CCM C according to one embodiment of the invention.

Figure 6:
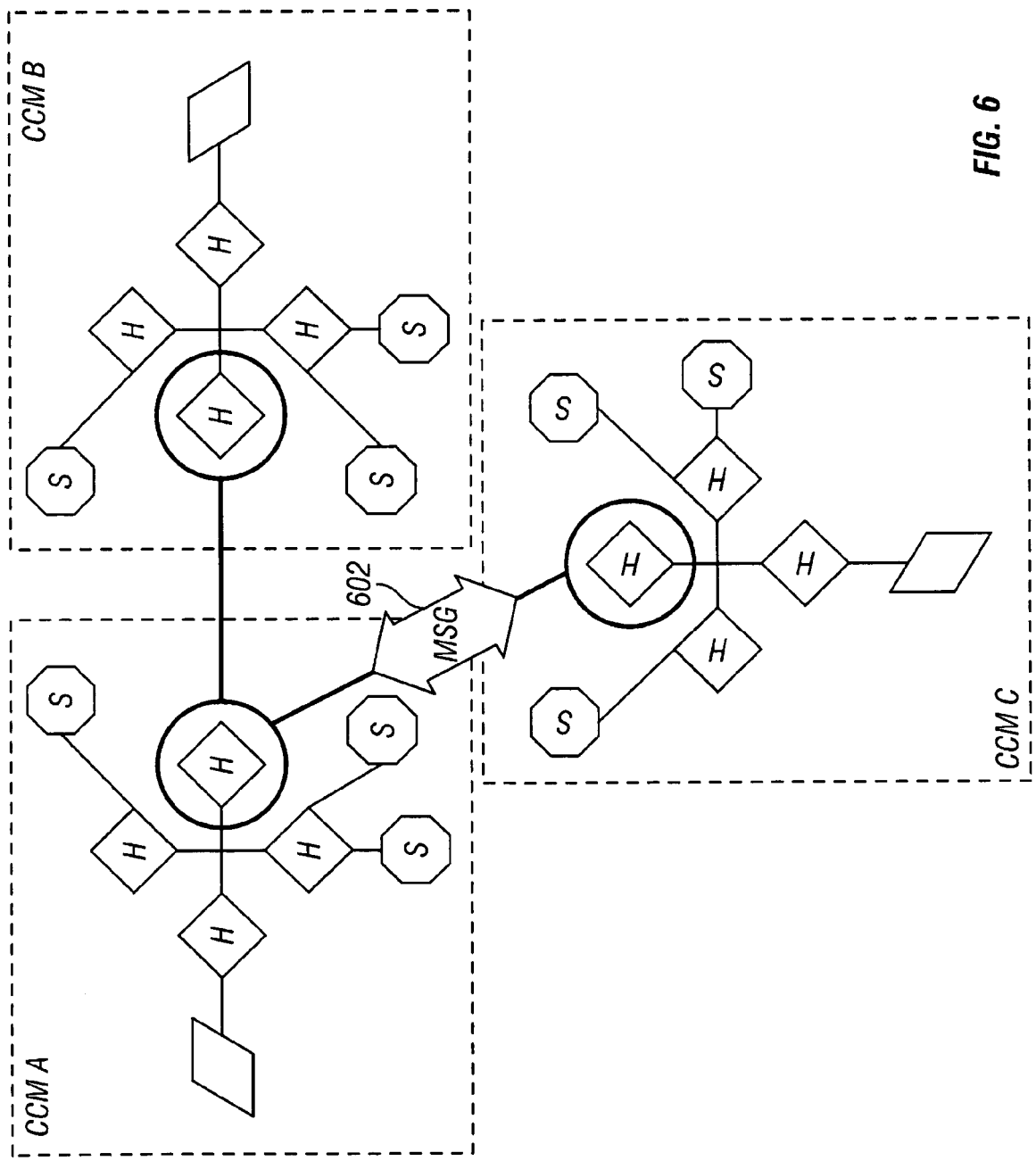
FIG. 6 is a schematic block diagram showing a channel as a pathway for exchange of message blocks between topological elements according to the invention.

Referring to FIG. 6, the channel 602 provides a pathway for the exchange of message blocks between topological elements when the model is executed.

Figure 7:
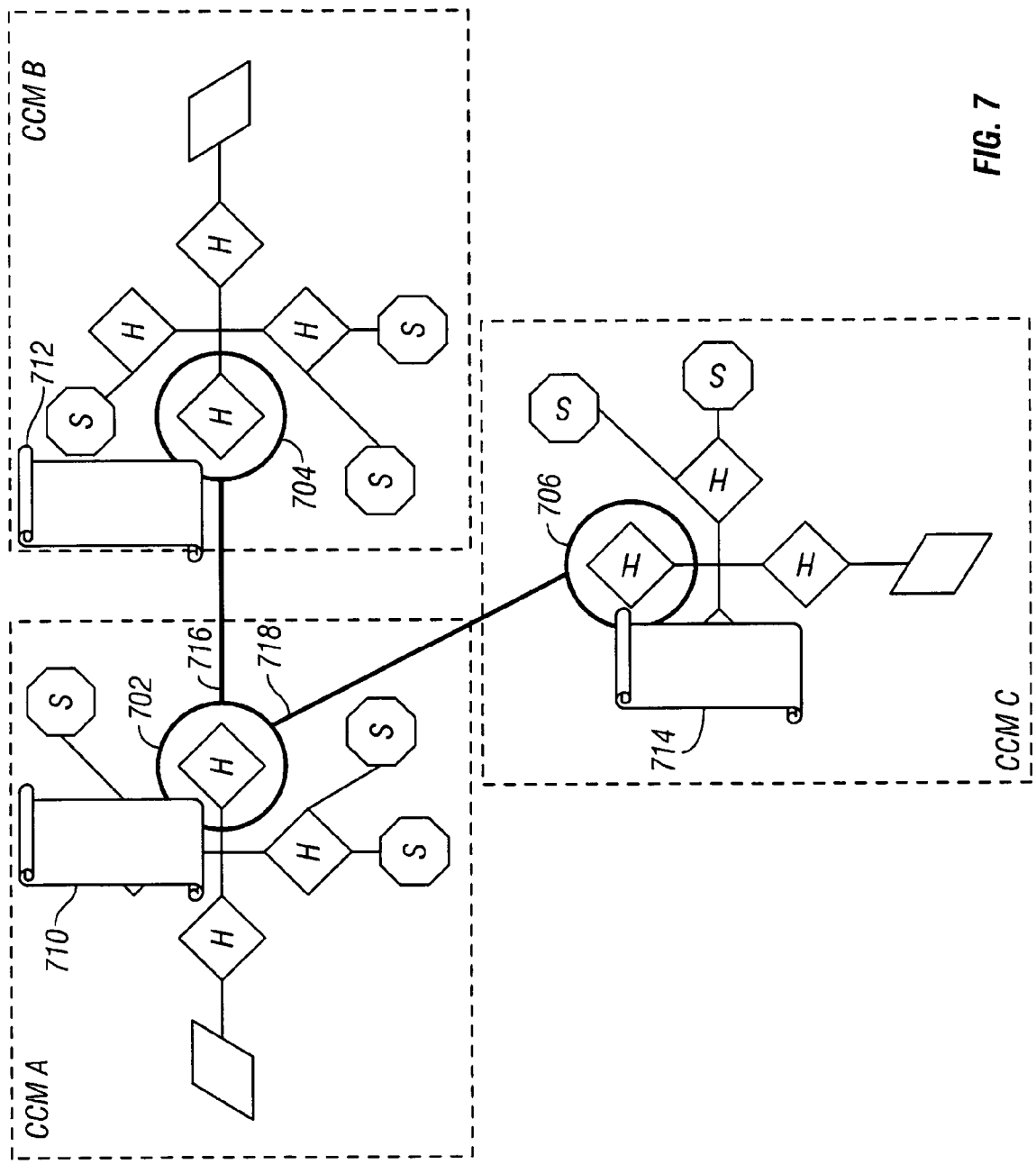
FIG. 7 is a schematic block diagram showing how ports associated with port specifications are used to ensure the validity of port-pair/channels when port-pair/channel are created according to the invention.

Referring to FIG. 7, each port (702, 704, 706) is associated with a port specification (710, 712, 714) that is used to ensure the validity of a port-pair/channel (716, 718) when the port-pair/channel is created.

Figure 8:
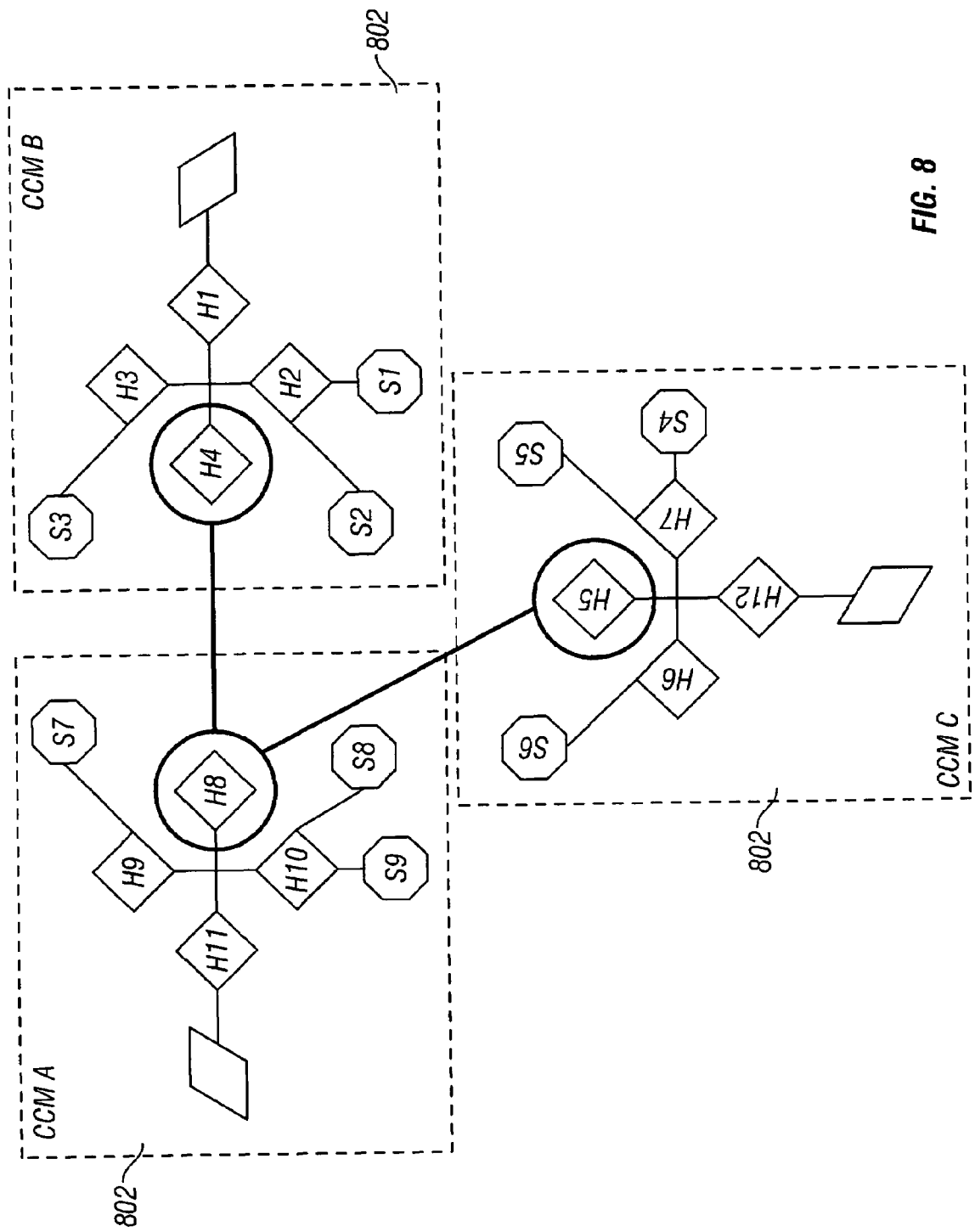
FIG. 8 is a schematic block diagram showing when component models are joined into a composite model according to the invention.

Referring to FIG. 8, when component models are joined into a composite model, the invention provides for naming conflicts between topology elements of the components to be identified and resolved. It should be appreciated that all element names throughout the composite are unique.

Figure 9:
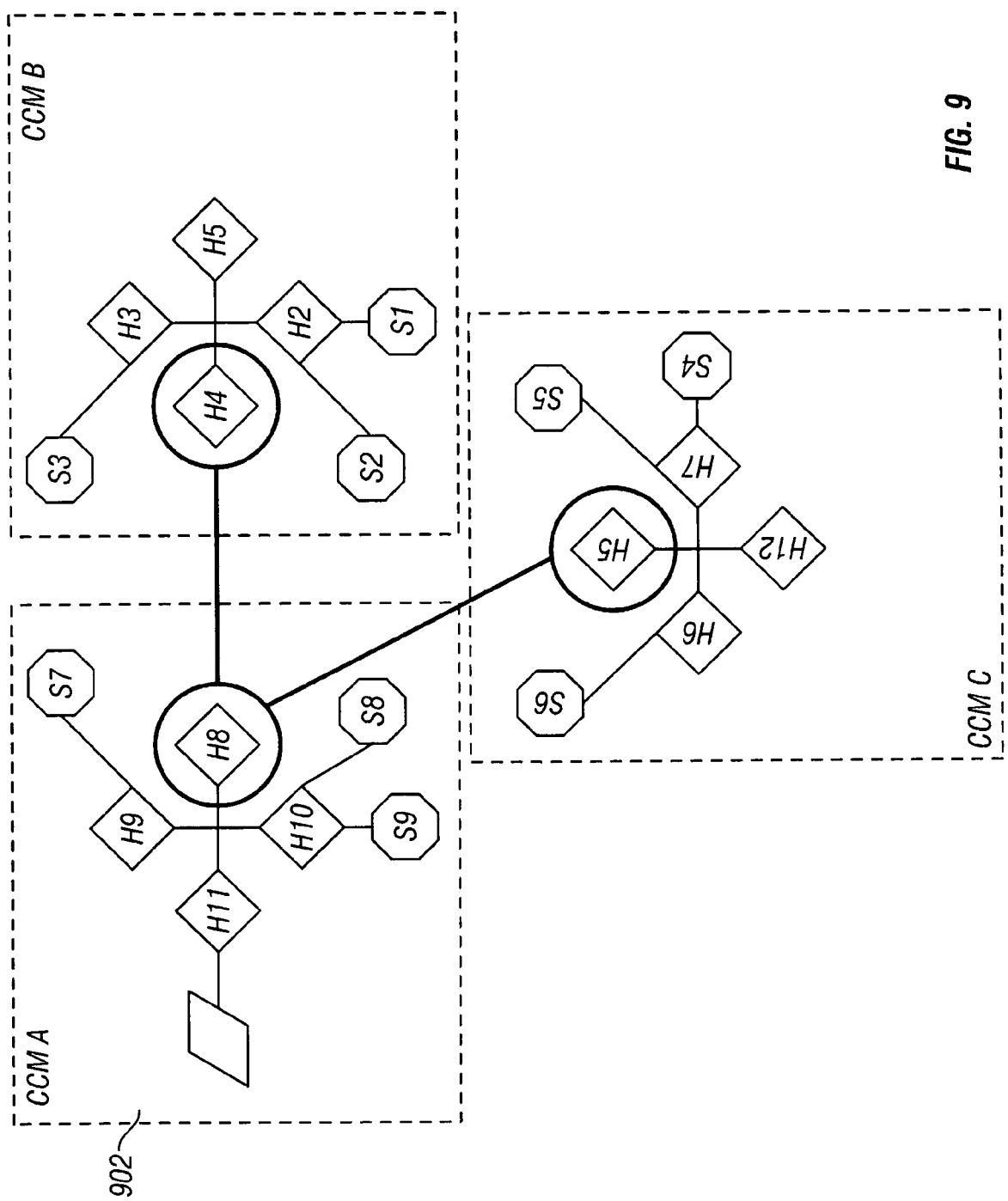
FIG. 9 is a schematic block diagram showing how a composite model generally is driven by a single workload according to the invention.

Referring to FIG. 9, it should be appreciated that the composite model generally is driven by a single workload object 902. The workload object represents the estimated burden of processing demand that is placed on the system under study. At least one workload object must be included in a single composite model. Zero, one or more workload objects may also be included in any common component model that is incorporated into a composite model. In a common component model, the workload object or objects are included to represent the background processing burden placed on the system under study.

Figure 10:
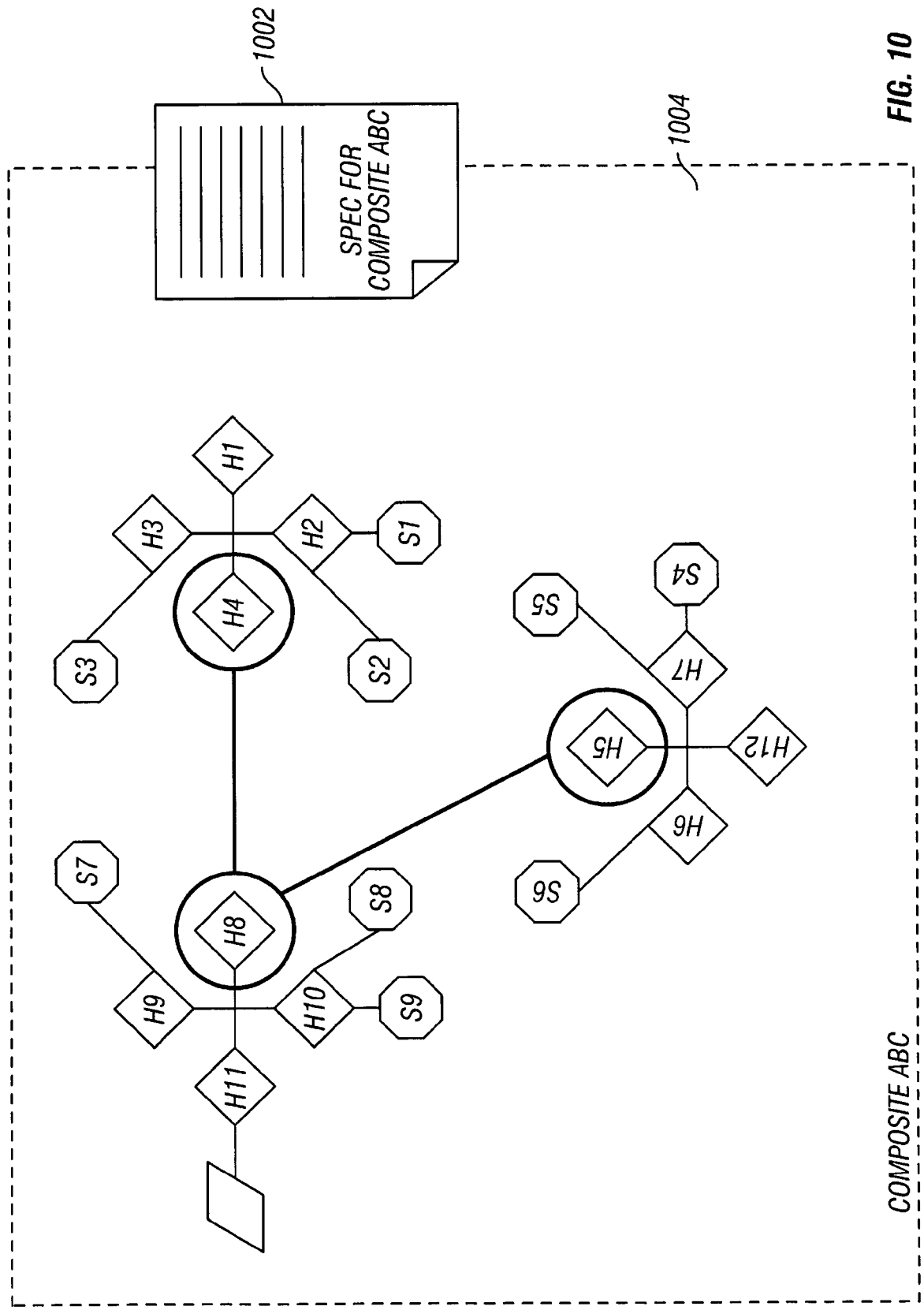
FIG. 10 is a schematic block diagram showing that a new composite model is saved as a specification and that a single topology produces a single output set according to the invention.

Referring to FIG. 10, it should be appreciated that in one embodiment of the invention, the new composite model is saved as a specification 1002 file, representing a single topology 1004, which produces at end a single output data set.

Batch Construction of a Composite Model

Figure 11:
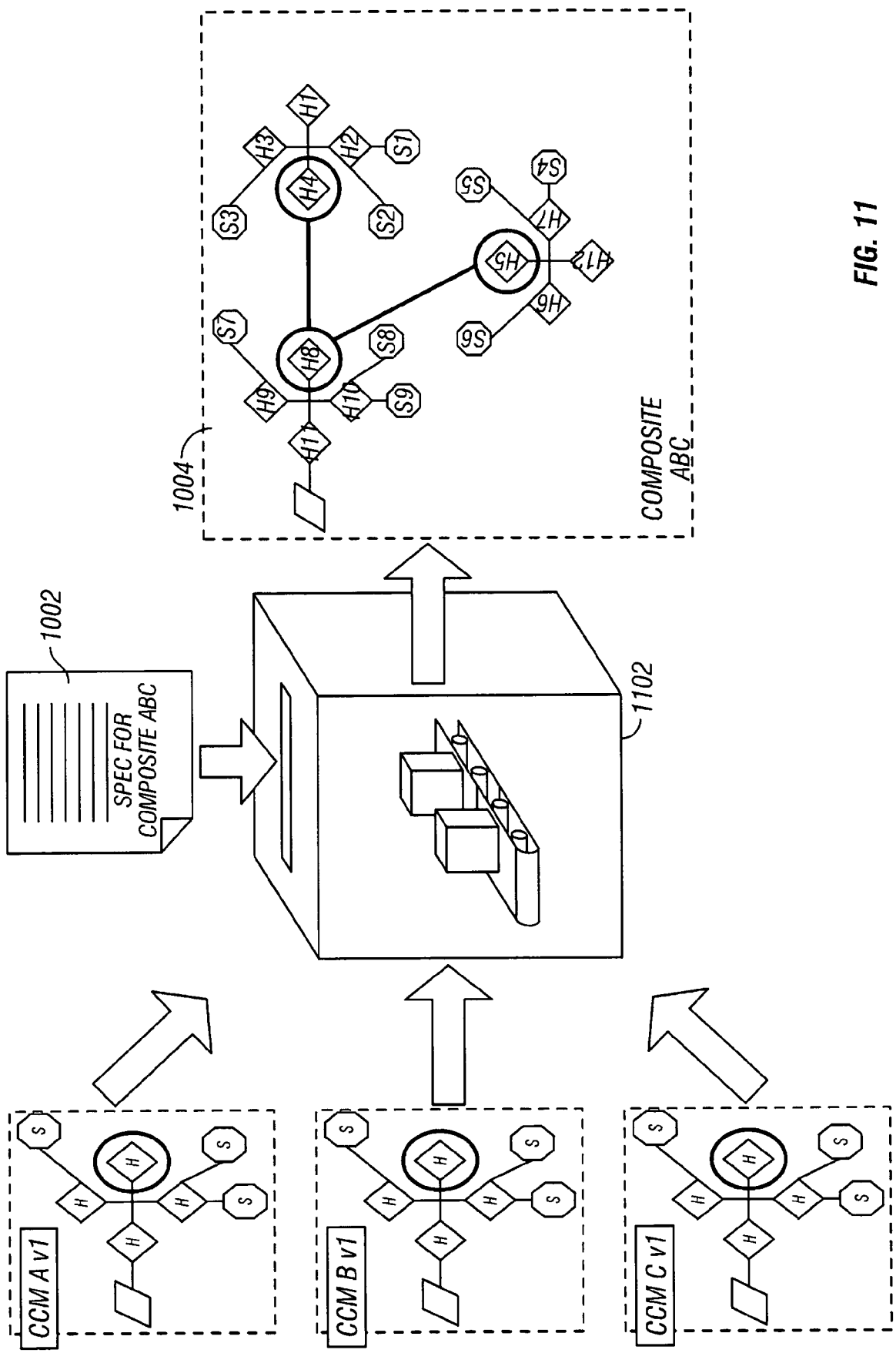
FIG. 11 is a schematic block diagram showing how once designed, a composite model can be reconstituted from its specification by an automated builder according to the invention.

Referring to FIG. 11, it should be appreciated that once designed, the composite model 1004 can be reconstituted from its specification 1002 by an automated builder 1102.

Figure 12:
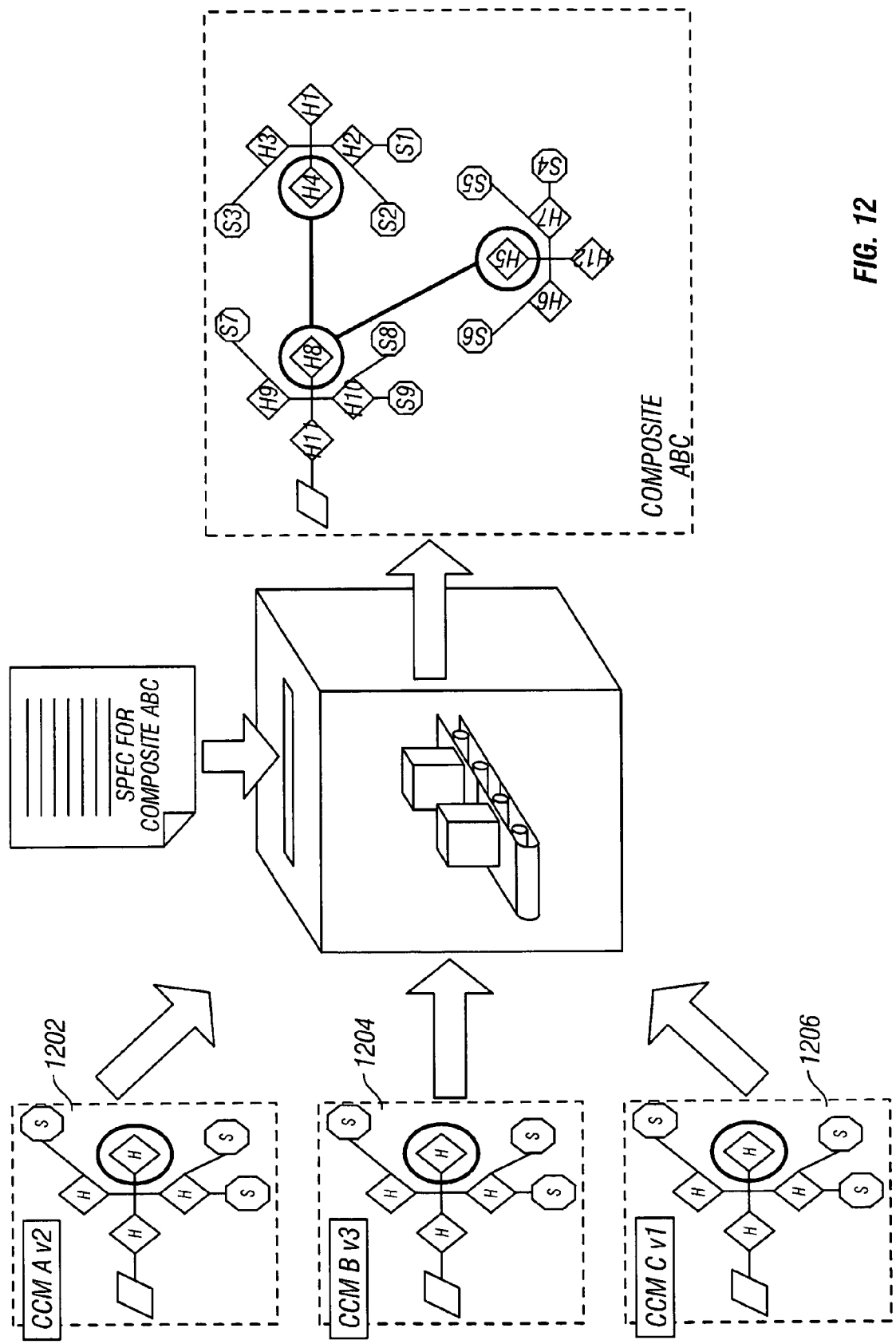
FIG. 12 is a schematic block diagram showing how changes made to the underlying component models are routinely propagated into the composite model according to the invention.

Referring to FIG. 12, it should be appreciated that batch construction of a composite model the invention provides a way for changes that are made to the underlying component models (1202, 1204, 1206) to routinely propagate into the composite model 1004.

Figure 13:
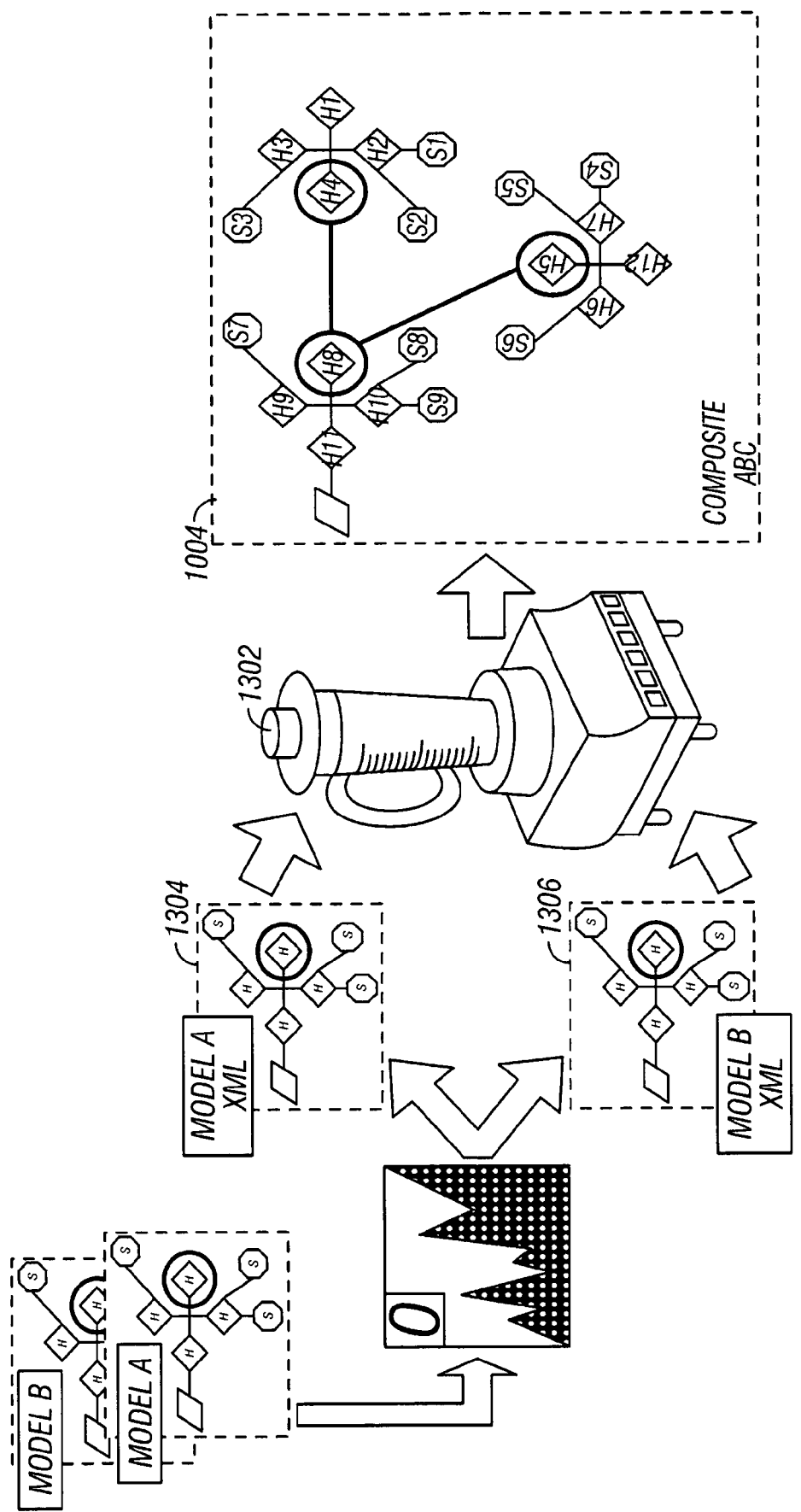
FIG. 13 is a schematic block diagram showing the composite model builder according to the invention.

One embodiment of the invention provides a composite model builder 1302 as depicted in FIG. 13. Such composite model builder provides the following initial functionality:

Initial functionality
  Operates on XML-compliant specifications of model topologies;
  Creates channels between component models with basic port specification;
  Identifies and resolves naming collisions;
  Retains specified workloads; and
  Generates single composite model for the discrete simulation operating platform;
Prototype "outboard" processor
  Framework for component model, composite model architecture; and
  compatible with one or more discrete simulation operating platforms;
Institutes composite composition processes
  Tools can evolve, but processes remain consistent
    Development;
    Testing; and
    Maintenance.

Referring to FIG. 13, the role played by the composite model builder is to output the composite model, the composite model builder having input data representing component models in XML format (1304, 1306).

Figure 14:
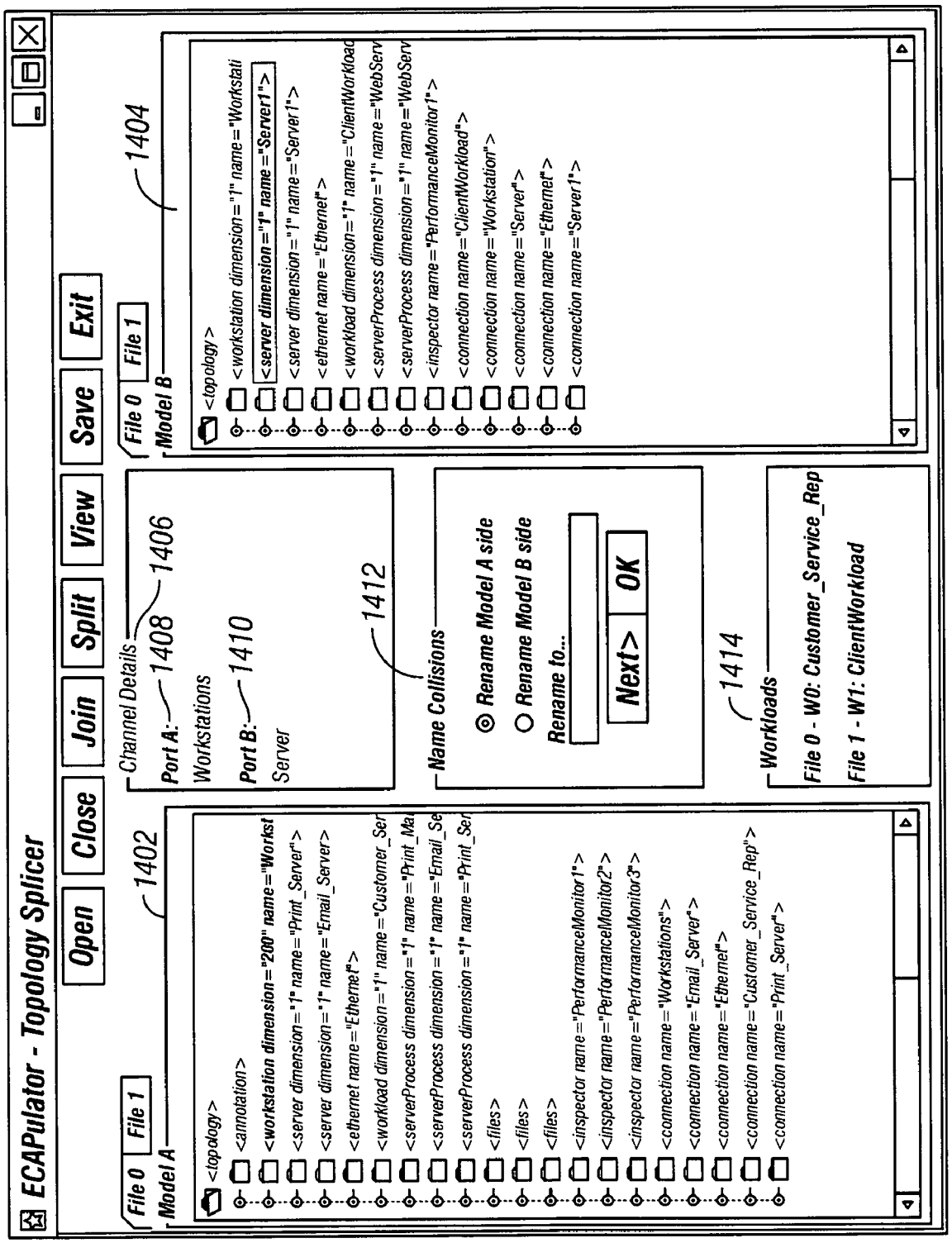
FIG. 14 is a screen shot of an example input/out screen showing topologies and other details of two component models according to the invention.

FIG. 14 is a screen shot of an example input/output screen showing the topologies of a component Model A 1402 and a component Model B 1404. Channel details 1406 and port details (1408, 1410) are also shown. Naming conflict resolution is also provided 1412. Workloads are also shown.

An Exemplary Component Model Example

The following hypothetical example serves to illustrate some of the practical aspects of utilizing common component models in the development or construction of a composite model.

The system under study, or target system, which is owned and operated by a large, multi-state bank, is an electronic mail (e-mail) system that is used to provide a service to its customers. The service consists of bulk, external distributions of customer-specific account balance data to individual customer's e-mail accounts on a daily basis. The essential elements of the system under study include:
- a single platform, multi-processor server hosting a commercial e-mail distribution software package, located in the bank's northern data center;
- an e-mail address directory subsystem, including all of the bank's customers, which is located in the bank's southern data center, some 1200 miles away;
- an individual account system of record, containing all of the records pertaining to each individual customer's savings accounts, also located in the bank's southern data center;
- a single high bandwidth network connection from the bank's e-mail host to an external internet service provider; and
- a private, high bandwidth network that provides data communications exclusively between systems that are located in the bank's northern and southern data centers.

This example can be elaborated by noting that both the address directory subsystem and the individual account system of record are themselves complex system configurations that are comprised of: host processors running application software of specific functionality; large-capacity high availability disk storage systems; and communications networks that link the components in each individual subsystem together, as well as providing connectivity to each of the subsystems. Furthermore, note that both these subsystems are utilized in the delivery of several additional services, other than the bulk e-mail distribution. They are thus identified as "common components," where their services are employed by several other services in common. The respective performance and capacity characteristics of each of these subsystems has been previously modeled in two separate and distinct simulations that were created and retained as common component models.

Devising a discrete simulation of the system under study requires the modeler to make a determination of the essential elements of the system under study. In this example, the five essential elements of the target system that are incorporated into the simulation are specified to include:
- the external communications link from the internet service provider into the host server of the e-mail application;
- the private broadband communications link between the e-mail application host server and the address directory system;
- the address directory system itself;
- the private broadband communications link between the e-mail application host server and the individual accounts system of record; and
- the individual accounts system of record itself.

Each of the identified essential elements must then be translated by the modeler into a software-based representation that reflects the performance and behavior characteristics of the actual elements in the target system under study. Some of the particular characteristics of the product of this translation effort, such as format, language, syntax, and data structures, can be dictated by the particular discrete simulation tool that is used by the modeler. The specific attributes distinguishing common component models, as defined and described in this application, can be expressed according to each tool's requirements, but can maintain the same meaning and significance across all varieties of implementations.

A prior art approach to discrete simulation would require the modeler to create each of the essential element representations by selecting and combining basic, functional units or "primitive" computational elements. In contrast, using a composite modeling approach, the modeler is equipped to browse through a collection or repository of simulation components in order to find a pre-engineered common component model already representing the features, functions, and capabilities that effectively represent an essential element. Each of the common component models are capable of being combined with one another into the higher order representation, or composite model, representing the entirety of the system under study.

In this example, for instance, in browsing through the bank's established collection of common component models, the simulation modeler discovers that a common component model of the address directory system, as well as a model of the individual account system of record, have already been devised and validated. Each common component model, organized as a single software file, has been deposited in the collection. The modeler then retrieves a copy of each of these component models, and examines the following attributes of each of the common component models in order to determine how they may be utilized in the context of the composite model that is being built.

In examining the contents of the software file containing the retrieved instance of the address directory system, the modeler determines the following attributes:
- the specification of the component model identifies a single port of the type HighBandwidthNetwork, which represents access to the data pathway through which requests for address entries are received and responded to with complete e-mail address entries drawn from the directory's storage;
- by examining the port specification that is included in the representation of the address directory system common component model, the modeler can determine that port is qualified to interconnect, or exchange data with, another component model that presents a port of the type HighBandwidthNetwork. Further information that is contained in the port specification includes an identification of two types of data that can be exchanged through this port, AddressRequest data and AddressResponse data. The port specification also specifies that only one AddressRequest may be processed at a time and requires a single AddressResponse for the implied transaction to be completed; and
- this common component model includes a legacy marker whose value is a text string, "AddressDirectory/single threaded e-mail address directory/04-10-2005/1.1.3." This marker uniquely identifies the reference name of the common component model, a summary description of its scope, its creation date, and the version or revision level that it reflects.

In examining the contents of the software file containing the retrieved instance of the individual account system of record, the modeler determines the following attributes:

the component model includes a single port of the type AnyNetwork, and represents access to the data pathway through which requests for individual account details are fulfilled from a large-scale database of individual account records;

by examining the port specification that is included in the representation of the individual account system of record common component model, the modeler can determine that the port is qualified to interconnect to, or exchange data with, another component model that presents a port of the type HighBandwidthNetwork, MediumBandwidthNetwork, or LowBandwidthNetwork. Further information that is contained in the port specification includes an identification of three types of data that can be exchanged through this port, AdminDetails data and TransactionDetails data, or ResultsDetails data. The port specification also specifies that as many as three requests be processed at a time. Each request is completed by returning ResultsDetails data for the implied transaction to be completed; and this common component model includes a legacy marker whose value is the following text string, "IndividualAccountSor/multi threaded account details records/02-12-2005/1.4.1." This marker, which is maintained unchanged in the specification of the composite model, uniquely identifies the reference name of the common component model. The legacy marker is comprise of several data items, separated by the forward slash ("/") character, including the common component name, brief functional description, creation date, and version or revision level that it reflects.

With the availability of the two common component models, the time and effort expended in the process of creating the more broadly scoped representation of the system under study is substantially shortened or reduced. Each of the common component models, representing the essential third and fifth elements from the list above is incorporated into the software structure of the composite model. In the context of this composite model, the modeler must design interconnections between each of the common components and a representation of the private broadband network that links the geographically dispersed data centers, such as the second and fourth items from the list above. Because no common component model of the private network was located by the modeler in the bank's models repository, the modeler must develop that representation from a combination of basic modeling primitives. The modeler will consider how to conform to the attributes and limits that are specified in the respective port specifications for each.

Once the composite model is constructed, it can be executed, or run, accordingly to the operating capabilities of the underlying discrete simulation tools. Each execution generates the set of data characterizing aspects of the system under study, as intended by the model's designer, which is then studied, analyzed, and subject to interpretation.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. An apparatus for generating a composite model from a plurality of component models, the apparatus including a computing device with a processor and instructions that, when executed by the processor, cause the computing device to implement:

a repository containing said plurality of component models, each component model in the plurality of component models being a software-based discrete event simulation that is designed to dynamically represent performance characteristics and capacity constraints of a different core business function in a plurality of core business functions, each core business function in the plurality of core business functions being an information technology function employed in a business, each component model in the plurality of component models including at least:

a port object that designates an interface at which said component model is able to interact with another component model in the plurality of component models;

a port specification object that defines specific capabilities and constraints associated with the port object; and a legacy marker object that provides a persistent identifier of said component model;

a composite model builder that, when executed by the processor:

receives a composite model specification as input, the composite model specification specifying the legacy marker objects of selected component models in the plurality of component models;

uses port specification objects of the selected component models to validate channels between port objects of the selected component models;

generates the channels when the channels are successfully validated, the channels providing pathways for exchange of message blocks between the port objects of the selected component models; and outputs said composite model, said composite model comprising the selected component models and the channels, said composite model dynamically representing performance characteristics and capacity constraints of a high-level business function of the business, said high-level business function using each of the core business functions represented by the selected component models, said high-level business function fulfilling a specific end-user need; and a simulation tool that, when executed by the processor, generates data representing performance characteristics of the high-level business function by executing the composite model.

2. The apparatus of claim 1, the instructions further causing the computing device to implement a workload object that represents a processing burden on the high-level business function.

3. The apparatus of claim 1, wherein a flag of said port object designates use of said port object.

4. The apparatus of claim 1, wherein said port specification object comprises data that:

uniquely identifies said port object;

identifies a category or type of said port object;

identifies types of port objects contained in other component models with which data is exchanged;

identifies categories of data being exchanged with said port object;

specifies limits as to an amount of data that is exchanged with said port object; and specifies limits as to a number of port objects with which said port object exchanges data.

5. The apparatus of claim 1, wherein said port specification object is accessed and evaluated by the composite model builder in an automated process.

6. The apparatus of claim 1, wherein said instructions further cause the computing device to:

identify and resolve naming conflicts between ones of the selected component models.

7. The apparatus of claim 1, wherein said instructions cause said computing device to:
store said composite model as a specification file.

8. The apparatus of claim 1, wherein said instructions further cause said computing device to:
receive a changed version of one of the selected component models; and
propagate the changed version of the one of the selected component models into the composite model.

9. A computer implemented method for generating a composite model from a plurality of component models, the method comprising:
storing, on a first physical computing device, a repository containing said plurality of component models, each component model in the plurality of component models being a software-based discrete event simulation that is designed to dynamically represent performance characteristics and capacity constraints of a different core business function in a plurality of core business functions, each core business function in the plurality of core business functions being an information technology function employed in a business, each component model in the plurality of component models including at least:
a port object that designates an interface at which said component model is able to interact with another component model in said plurality of component models; and
a port specification object that defines specific capabilities and constraints of said port object;
receiving, at the first physical computing device, a composite model specification as input, the composite model specification specifying selected component models in the plurality of component models;
using, at the first physical computing device, the port specification objects of the selected component models to validate channels between port objects of the selected component models;
generating, at the first physical computing device, the channels when the channels are successfully validated, the channels providing pathways for exchange of message blocks between the port objects of the selected component models;
outputting, at the first physical computing device, said composite model, said composite model comprising the selected component models and the channels, said composite model dynamically representing performance characteristics and capacity constraints of a high-level business function of the business, said high-level business function using each of the core business functions represented by the selected component models, said high-level business function fulfilling a specific end-user need; and
generating, at the first physical computing device, data representing performance characteristics of the high-level business function by executing the composite model.

10. The computer implemented method of claim 9, further comprising:
prior to outputting said composite model:
identifying, at the first physical computing device, naming conflicts between ones of the selected component models; and
resolving, at the first physical computing device, the naming conflicts.

11. The computer implemented method of claim 9, wherein said composite model is driven by one or more workload objects representing processing burden on the high-level business function.

12. The computer implemented method of claim 9, further comprising: storing, by said first physical computing device, said composite model as a specification file.

13. The computer implemented method of claim 9, further comprising:
receiving, at the first physical computing device, a changed version of one of the selected component models; and
propagating, at the first physical computing device, the changed version of the one of the selected component models into the composite model.

14. The computer implemented method of claim 9, further comprising providing a flag of said port object to designate use of said port object.

15. The computer implemented method of claim 9, wherein said port specification object comprises data that:
uniquely identifies said port object;
identifies a category or type of said port object;
identifies types of port objects contained in other component models with which data is exchanged;
identifies categories of data being exchanged with said port object;
specifies limits as to an amount of data that is exchanged with said port object; and
specifies limits as to a number of port objects with which said port object exchanges data.

* * * * *